United States Patent [19]

Leysieffer et al.

[11] 4,274,112

[45] Jun. 16, 1981

[54] SWITCHING MATRIX FOR SELECTIVELY CONNECTING INCOMING SIGNALS TO DESIRED OUTPUT PATHS

[75] Inventors: Hans Leysieffer, Icking; Klaus Panzer, Munich, both of Fed. Rep. of Germany

[73] Assignee: Siemens Aktiengesellschaft, Berlin & Munich, Fed. Rep. of Germany

[21] Appl. No.: 53,090

[22] Filed: Jun. 28, 1979

[30] Foreign Application Priority Data

Jun. 29, 1978 [DE] Fed. Rep. of Germany ....... 2828662

[51] Int. Cl.³ .............................................. H04N 5/22
[52] U.S. Cl. ............... 358/181; 179/18 GE; 333/101; 340/166 R
[58] Field of Search ................ 358/181; 455/615, 600; 179/18 GE, 18 GF; 340/166 R; 333/101, 103

[56] References Cited

U.S. PATENT DOCUMENTS 3,470,499 9/1969 Lentz ................................. 333/101
4,165,497 8/1979 Irons .............................. 179/18 GF

FOREIGN PATENT DOCUMENTS 2121611 11/1972 Fed. Rep. of Germany .

OTHER PUBLICATIONS

"Solid State Video Switching Matrix", Shelton, BBC Engineering, Jul. 1970.

*Primary Examiner*—Robert L. Richardson
*Attorney, Agent, or Firm*—Hill, Van Santen, Steadman, Chiara & Simpson

[57] ABSTRACT

The invention relates to a circuit arrangement for passing of blocking signals having wide band width with the use of at least one electronic switch. The circuit is a very simple arrangement, and provides for a plurality of modulators, or at least one modulator prior to the switching, and wherein the electronic switch is utilized is a logical linkage. The circuit is particularly adaptable for use in television circuits for distributing television signals.

9 Claims, 2 Drawing Figures

SWITCHING MATRIX FOR SELECTIVELY CONNECTING INCOMING SIGNALS TO DESIRED OUTPUT PATHS

BACKGROUND OF THE INVENTION

1. Field of the Invention

This invention relates in general to a circuit arrangement for switching or blocking wide band width signals utilizing at least a single electronic switch, and the circuit is particularly adaptable for distribution of video signals.

2. Description of the Prior Art

Cross bar distributors for video signals are known, as for example, in German AS No. 2,121,611. In the construction of such a distributor because of the wide band width of the signals to be transmitted, great care must be undertaken to meet the requirements to prevent non-linear distortion and high cross-talk continuation. If mechanical switches are not used as cross points, it is possible to utilize a cross bar distributor for example, with active cross points and corresponding control or drive circuits. Special circuits are required for such video cross points so as to be able to retain the linearity and cross talk attenuation requirements.

SUMMARY OF THE INVENTION

It is an object of the present invention to provide a circuit arrangement for switching of wide band video signals which utilizes electronic switches and which can be constructed in a very simple manner. The circuit arrangement is designed to include a modulator which is connected prior to the electronic switch or switches and the modulator modulates a carrier by the signals so that the information will occur at the time when the carrier has been modulated to a zero value, and wherein the electronic switch or switches are designed as logical linkages. The advantage of the electronic switches of the invention result in a very simple circuit and allow less distortion and cross talk than circuits of known arrangements. The circuit is particularly useful for wide band video signals.

When the electronic switches or cross points of a switching matrix of a cross bar distributor in which input lines may be selectively connected by way of the cross points with output lines, the invention provides for a respective modulator to be connected to the input lines and a respective demodulator to be connected to the output lines. In the case of modulation of the signals, the upper limiting frequency is greater than in the original position of the signals, the requirements and demands limitations of the cross points are significantly lowered.

The demodulator can be respectively connected directly to the output of the electronic switch or switches, and directly to the output lines. Alternatively, the respective signal transmissions segment can be moved between the electronic switch and the output line of the switching matrix, and the demodulator can then simultaneously serve as the transmission modulator for the signal transmission.

If in the switching matrix a plurality of output lines is greater than the number of input lines, or if the plurality of participants is greater than the plurality of the programs in a program distribution system, then additional advantage results in that fewer modulators are required than would be the case if there was an allocation of modulators to individual signal transmission segments.

An additional development of the invention provides that the modulator is designed as a frequency modulator, so that the frequency modulated signals can be transmitted by way of an optical transmission path such that the light wave guide transmission system and the circuit arrangement operate with the same frequency modulated carrier. Such an arrangement is particularly suited for distribution of TV signals.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
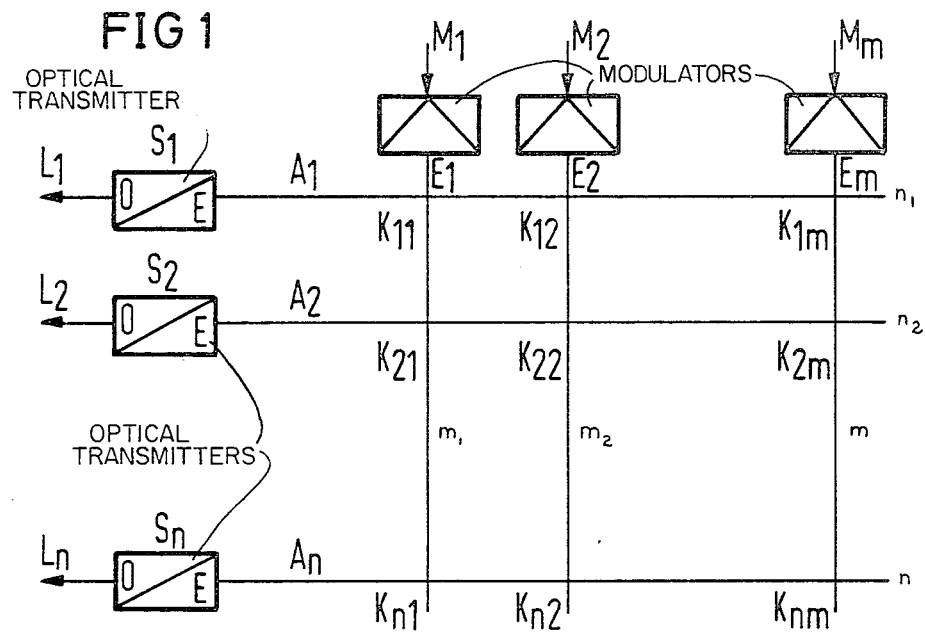
FIG. 1 is a block circuit diagram for the invention illustrating distribution of video signals by means of frequency modulated sub-carriers.
Figure 2:
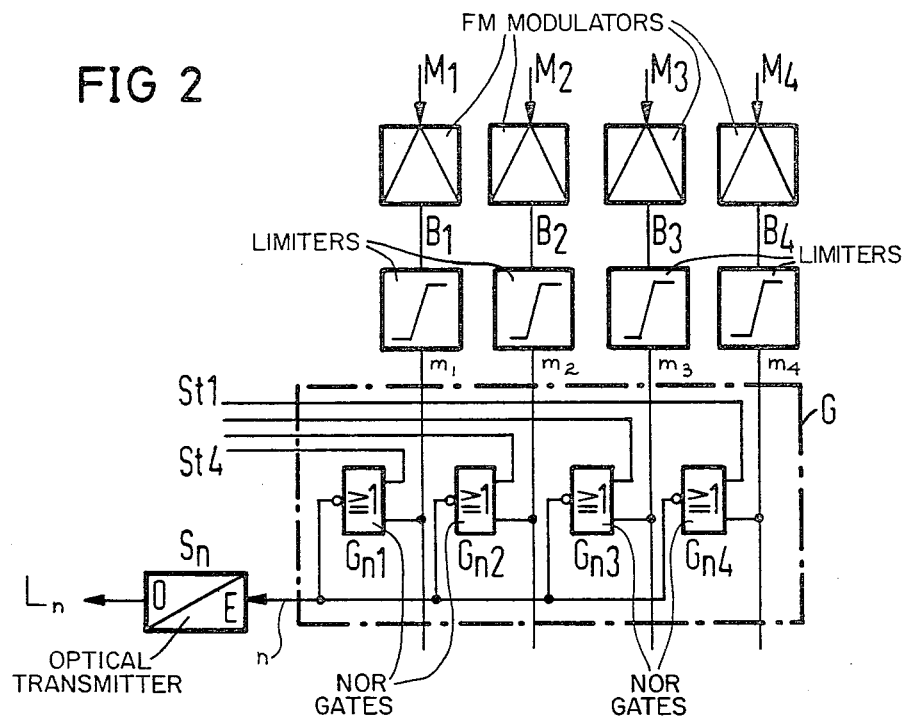
FIG. 2 is a block diagram illustrating circuit details in greater detail of the arrangement of FIG. 1.

The switching matrix of the invention illustrated in FIG. 2 is constructed as a cross bar distributor, and has a plurality of m input lines which cross a plurality of n output lines. A plurality of n.m coupling points or cross points are provided for the optional connection of input to output lines. In FIG. 1, the couplings or cross points are designated as $K_{11} \ldots K_{nm}$, and are shown adjacent the crossing points.

A plurality of modulators $M_1 \ldots M_m$ are connected to the inputs $E_1 \ldots E_m$ of each of the input lines m, as shown. A plurality of optical transmitters $S_1 \ldots S_n$ are respectively connected to each of the outputs $A_1 \ldots A_n$ of each output line n, as shown. Optical lines $L_1 \ldots L_n$ are respectively connected to the outputs of each of the optical transmitters $S_1 \ldots S_n$.

Because it is not the video signal itself, but rather a sub-carrier frequency modulated with the video signal which passes over the matrix cross points, simple logical gates can be employed as the matrix switches. Such simple switches, in addition to providing a very simple arrangement, also provide that very low power consumption will occur, which is of particular advantage.

A further advantage of the switching matrix arrangement illustrated in FIG. 1 is that the relatively high lower limiting frequency of approximately 5 MHz exists. In a video coupling field of the conventional type, on the other hand, a lower limiting frequency occurs such as at a few Hz, so that a relatively great outlay of equipment and cost can occur in such prior art systems, due to the expensive control signals required in the control or drive circuit of such systems.

In addition to its advantage in the switching matrix, the use of a frequency modulated sub-carrier can also prove to be particularly advantageous in the optical transmission paths, as for example, in providing low non-linear distortion in the light emitting diodes and also in providing low signal-to-noise ratios so that transmission can occur over great distances.

The use of logical switch linkages as coupling points is not only advantageous in operation using frequency modulated signals, but other types of modulation can also be used in which the information occurs during the time the carrier has been modulated to zero such as in PFM or pulse frequency modulation, PM or phase modulation, PPM or pulse phase modulation, or PDM or pulse duration modulation.

One or more connection lines in the form of a glass fiber conductor passes from the outputs of the switching matrixes to each subscriber. Also, a return channel can be provided from the subscriber to the central switching matrix so that a subscriber can select which ones of the wide band signals available at the central station is to be switched to the glass fiber conductor which connects him with the station.

FIG. 2 is a greater detail view of the switching matrix illustrated in FIG. 1. Various input video signals are supplied respectively to the FM modulators $M_1 \ldots M_4$. The outputs of these modulators $M_1 \ldots M_4$ are respectively connected to the inputs of a plurality of limiters $B_1 \ldots B_4$, which can be designed as comparators. It is advantageous if the signal passes through zero during the switching time of the switching linkage, which can be very fast. In FM and PM modes, this advantage is achieved, due to the transition to "rectangular-FM" or, respectively, "rectangular-PM" by the use of amplitude limitation and amplification which occurs in earlier stages.

The switching at the crossing points is accomplished in a semiconductor chip G which contains four switching linkages which are respectively designed as NOR elements. In each of these NOR elements $G_{n1} \ldots G_{n4}$, one of the two inputs is connected to the output of one of the limiters $B_1 \ldots B_4$ on the input lines m, and a second input is received from control lines $St1 \ldots St4$. For example, if a logic level 1 occurs on the control input line, the switch $G_n$ will be blocked, and a signal level of zero on the control line St allows the input on the line m to be supplied to the output line n. Each of the NOR elements $G_n$ are connected to the associated output line n. It is to be realized that a plurality of the chips G will include a plurality of the NOR elements $G_n$ for each of the output lines, but in FIG. 2, only one output line is illustrated for simplicity.

The output line n is connected to an optical transmitter $S_n$ which is connected to the optical line LN.

So as to maintain the switching time as small as possible, the switching linkages are constructed in ECL technology, and are such that their outputs can be directly switched in parallel in the manner of so-called wired OR circuits without the use of an additional OR element.

Logical level zero at the control input assures that the linkage functions as an inverter for the signal to be connected through the switching path. If the NOR elements are replaced with AND elements, then the logical level of 1 on the control lines St will turn the AND elements on and level zero will turn them off.

In a particular arrangement, OR elements or NOR elements formed in TTL technology and which utilize an open collector output are particularly suited for the circuits of the invention, since an output side junction formed as a "wired AND circuit" or as a wired OR circuit is possible, and can be utilized.

Although the invention has been described with respect to preferred embodiments, it is not to be so limited as changes and modifications can be made, which are within the full intended scope as defined by the appended claims.

We claim as our invention:

1. A circuit arrangement for selectively connecting a plurality of input lines to a plurality of output lines for passing or blocking wide band modulated carrier signals which are pulse, phase, pulse duration, pulse phase, or pulse frequency modulated, comprising a plurality of modulators to which said plurality of input lines are connected and performing modulation on signals passing therethrough, an electronic switching matrix with a plurality of row and column lines which cross each other with electronic switching means at the crossing points, the outputs of said plurality of modulators connected to said plurality of column lines, a plurality of optical transmitters connected to said plurality of row lines, and a plurality of output lines connected to said plurality of optical transmitters.

2. A circuit arrangement according to claim 1, characterized in that the signals with wide band width are video signals.

3. A circuit arrangement according to claim 2, characterized in that the number of output lines is greater than the number of input lines.

4. A circuit arrangement according to claim 2, characterized in that the modulator is designed as a frequency modulator.

5. A circuit arrangement according to claim 4, characterized in that the frequency-modulated signals are respectively transmitted by way of an optical transmission path through said plurality of optical transmitters.

6. A circuit arrangement according to claim 2, characterized in that the modulator is a phase modulator.

7. A circuit arrangement according to claim 2, including a plurality of amplitude limiters respectively connected between said modulator and said switching means.

8. A circuit arrangement according to claim 7, characterized in that a plurality of amplifiers are connected between said modulators.

9. A circuit arrangement according to claim 2, characterized in said switching means comprise NOR elements formed in ECL technology which are respectively connected on their output side to a corresponding output line in the manner of a wired OR circuit.

* * * * *